United States Patent

[11] 3,580,625

| [72] | Inventor | Edwin F. Booth |
| | | Rte. 1, Alamosa, Colo. 81146 |
| [21] | Appl. No. | 843,410 |
| [22] | Filed | July 22, 1969 |
| [45] | Patented | May 25, 1971 |

[54] ATTACHMENT FOR A TINED FORK
5 Claims, 2 Drawing Figs.

| [52] | U.S. Cl. | 294/59, 56/327 |
| [51] | Int. Cl. | A01d 9/00 |
| [50] | Field of Search | 294/59; 46/25, 26, 28, 29; 287/54 (D) |

[56] References Cited
UNITED STATES PATENTS
2,688,511 9/1954 Pelletier .................. 294/59
2,958,142 11/1960 Kershaw et al. .............. 46/29

FOREIGN PATENTS
591,036 4/1959 Italy ......................... 46/28

*Primary Examiner*—Evon C. Blunk
*Assistant Examiner*—Stephen P. Garbe
*Attorney*—Bertha L. MacGregor

ABSTRACT: An attachment for a tined fork comprising a generally U-shaped body having substantially parallel hollow side members connected to a curved body portion, the side members being dimensioned to fit frictionally on the ends of a pair of adjacent tines of a fork, and to be firmly retained thereon without fastening means but removable for replacement. The attachment prevents injury to potatoes and other produce being handled by the fork.

PATENTED MAY 25 1971 3,580,625

INVENTOR.
Edwin F. Booth
BY
Bertha L. MacGregor
ATTORNEY

ATTACHMENT FOR A TINED FORK

This invention relates to an attachment for a tined fork adapted for digging or handling vegetables such as potatoes, beets and the like.

The main object of the invention is to provide an attachment designed to frictionally engage a pair of adjacent tines of a fork, to thereby cover the pointed tips of the tines and to provide a smooth, curved end to the pair of tines. Another object of the invention is to provide an attachment which can be applied to and removed from the tines quickly and easily, and which is firmly held in place without any fastening means.

Potatoes and other vegetables can be handled by the use of a fork provided with the attachment of my invention without danger of injury to the produce, such as commonly occurs when pointed tine forks are employed for this purpose. Another advantage of the invention is the ease of replacement of the attachments whereby the usefulness of the tined fork may be substantially increased and prolonged.

Figure 1:
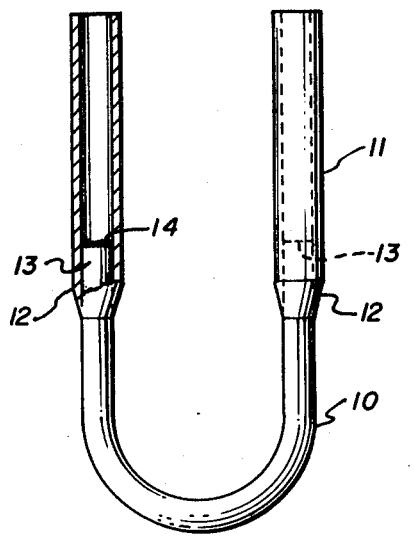
FIG. 1 is an elevational view of an attachment for a tined fork embodying my invention, showing one of the two side members in section to reveal the internal construction.
Figure 2:
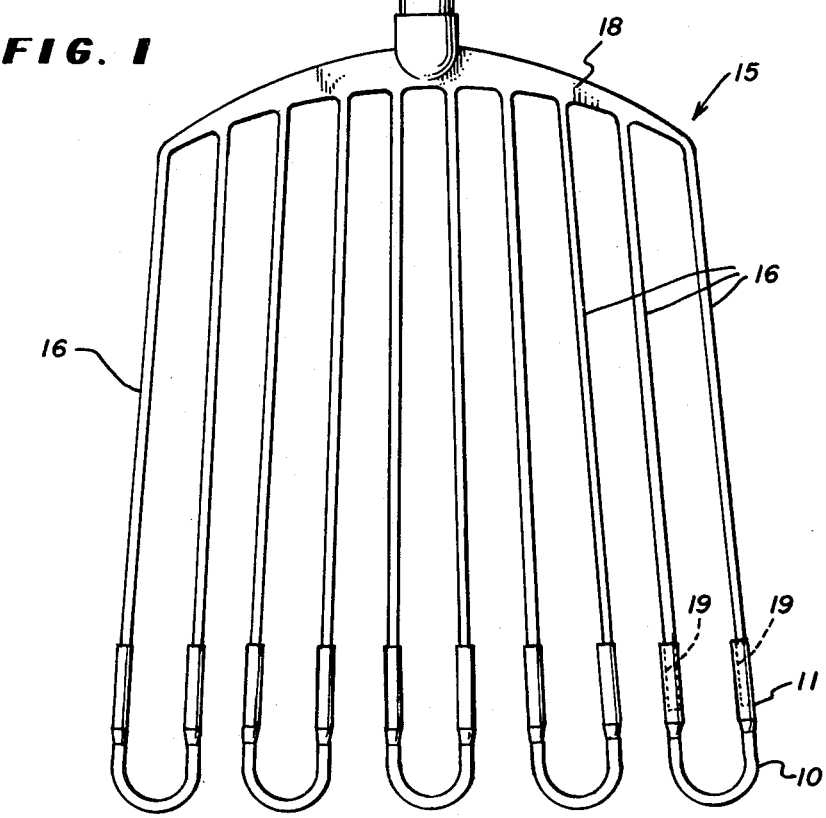
FIG. 2 is an elevational front view, partly broken away, of a tined fork to which the attachment of my invention has been applied.

In the embodiment of my invention shown in the drawings, the attachment for a tined fork comprises a U-shaped device having a solid curved body 10 and a pair of hollow tubular side members 11 of steel or other suitable durable material. The side members 11 have end portions 12 which receive and surround the end portions 13 of the U-shaped body 10. The side members 11 are rigidly secured to the body 10 by welding or soldering 14 or other suitable means.

A conventional tined fork 15 comprises tines 16, handle 17 and a crosspiece 18 between the handle and the tines. The lower ends 19 of each of the several pairs of tines are inserted into the open ends of the side members 11. The internal diameter of the side members 11 is such that the tines of conventional vegetable forks have a tight fit therein, regardless of whether the tines are circular, hexagonal or other shape in cross section. The tubular side members 11 are substantially parallel to each other and spaced apart from center to center a distance substantially equal to the distance, from center to center, between a pair of tines 16. Slight variation in the dimensions serves to provide additional firm frictional engagement between the side members 11 of the attachment and the ends of a pair of tines 16 due to lateral pressure exerted by either the side members or the tines. Such side pressure may be observed particularly when the attachment is applied to pairs of tines of a fork having nonparallel tines extending in slightly divergent directions toward their free ends. However, even when both side members 11 and the tines 16 of a pair of tines are parallel to each other, the dimensions are such that a tight fit exists between the contacting parts, such that the attachment is firmly retained on the tines until removal for replacement purposes is required.

The attachment device may be made of tubular stock throughout instead of using the solid curved body 10 and attached tubular side members 11 shown herein. Conventional tined forks are commonly provided with an even number of tines, so that the attachment of my invention may be applied to pairs of tines comprising all the tines of the fork.

I claim:

1. In combination with a tined fork having a plurality of pairs of tines each having a free end, a curved body having a pair of hollow tubular side members positioned on and firmly engaging the free end portions of a pair of adjacent tines of said fork.

2. The combination defined by claim 1, in which the curved body is solid and the side members are lengths of tubing which partially surround the ends of the curved body and are rigidly connected thereto.

3. The combination defined by claim 1, in which the tubular side members are substantially parallel to each other and their internal diameter is such that said side members exert lateral pressure on the tines of a pair of adjacent tines when the curved body is applied to said tines.

4. The combination defined by claim 1, in which the curved body is U-shaped, and in which the side members are substantially parallel to each other and their internal diameter is such that firm frictional contact with the tines exists when the curved body is applied to said tines.

5. The combination defined by claim 2, which includes welding material connecting the hollow side members to the curved body.